(12) United States Patent
Lin et al.

(10) Patent No.: US 8,126,100 B2
(45) Date of Patent: Feb. 28, 2012

(54) COMMUNICATION PROTOCOL METHODS

(75) Inventors: Kuo-Ting Lin, Taipei County (TW); Tsung-Yuan Tu, Taipei (TW); Jie-De Hung, Taipei County (TW)

(73) Assignee: Princeton Technology Corporation, Taipei County (TW)

( * ) Notice: Subject to any disclaimer, the term of this patent is extended or adjusted under 35 U.S.C. 154(b) by 954 days.

(21) Appl. No.: 12/041,446

(22) Filed: Mar. 3, 2008

(65) Prior Publication Data

US 2009/0041133 A1  Feb. 12, 2009

(30) Foreign Application Priority Data

Aug. 7, 2007 (TW) .................. 96128977 A

(51) Int. Cl.
*H04L 7/00* (2006.01)

(52) U.S. Cl. ........ 375/354; 375/219; 327/141; 327/142; 327/143; 358/409; 358/414; 358/419; 358/424; 713/400; 714/12

(58) Field of Classification Search ............. 375/354, 375/219; 327/141, 142, 143; 358/409, 414, 358/419, 424; 713/400; 714/12
See application file for complete search history.

(56) References Cited

U.S. PATENT DOCUMENTS 5,268,906 A * 12/1993 Free ......................... 714/708
6,067,629 A * 5/2000 Murray et al. ............ 713/400
* cited by examiner

*Primary Examiner* — David C. Payne
*Assistant Examiner* — Zewdu Kassa
(74) *Attorney, Agent, or Firm* — Muncy, Geissler, Olds & Lowe, PLLC

(57) ABSTRACT

Communication protocol methods for performing signal synchronization, data transmission, and data acknowledgement between a transmitting device and a receiving device are provided. The methods are characterized by a plurality of transmission lines which are used for performing signal synchronization, data transmission, and data acknowledgement by the communication protocol methods.

11 Claims, 4 Drawing Sheets

COMMUNICATION PROTOCOL METHODS

BACKGROUND OF THE INVENTION

1. Field of the Invention

The disclosure relates generally to communication protocol methods, and, more particularly to communication protocol methods for use between a transmitting device and a receiving device.

2. Description of the Related Art

Due to continued development and increasing consumer requirements for electronic apparatuses, new products with powerful functionalities are continuously being developed, raising the complexity of electronic apparatuses. As such, more and more electronic devices are being integrated within a single electronic apparatus. Thus, it has become an important issue for those skilled in the art, to provide communication protocol methods which efficiently and conveniently perform instructions for transmission and data access, confirm the completeness of transmitted data, and manage interaction among different electronic devices stably, for continued development of electronic apparatuses.

BRIEF SUMMARY OF THE INVENTION

An objective of the invention is to provide communication protocol methods that improve the efficiency and completeness of data transmission.

In an embodiment of a communication protocol method, a first transmission line (DATA), a second transmission line (ACK), and a third transmission line (STB) are used for performing signal synchronization, data transmission, and data acknowledgement between a transmitting device and a receiving device. The first transmission line is used for transmitting data, the second transmission line is used for acknowledging data transmission, and the third transmission line is used for performing signal synchronization.

Communication protocol methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Communication protocol methods are provided.

Figure 1:
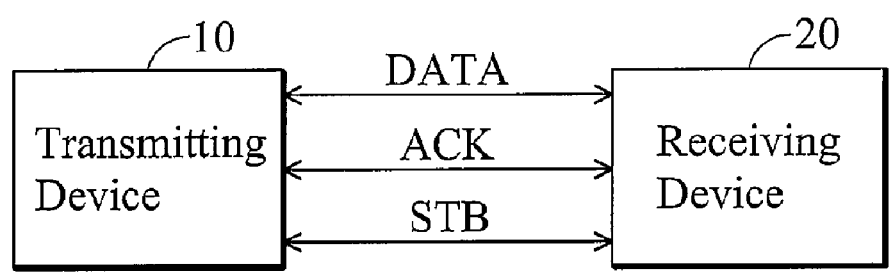
FIG. 1 is a schematic diagram illustrating an embodiment of a communication protocol method.

FIG. 1 is a schematic diagram illustrating an embodiment of a communication protocol method. As shown in FIG. 1, the communication protocol method is used for performing signal synchronization, data transmission, and data acknowledgement between a transmitting device 10 and a receiving device 20. The characteristic of the communication protocol method is that a plurality of transmission lines DATA, ACK and STB are used for performing signal synchronization, data transmission, and data acknowledgement. In one embodiment, the transmission lines DATA, ACK and STB comprises a first transmission line DATA, a second transmission line ACK, and a third transmission line STB, wherein the first transmission line DATA is used for transmitting data, the second transmission line ACK is used for acknowledging data transmission, and the third transmission line STB is used for performing signal synchronization.

Figure 2:
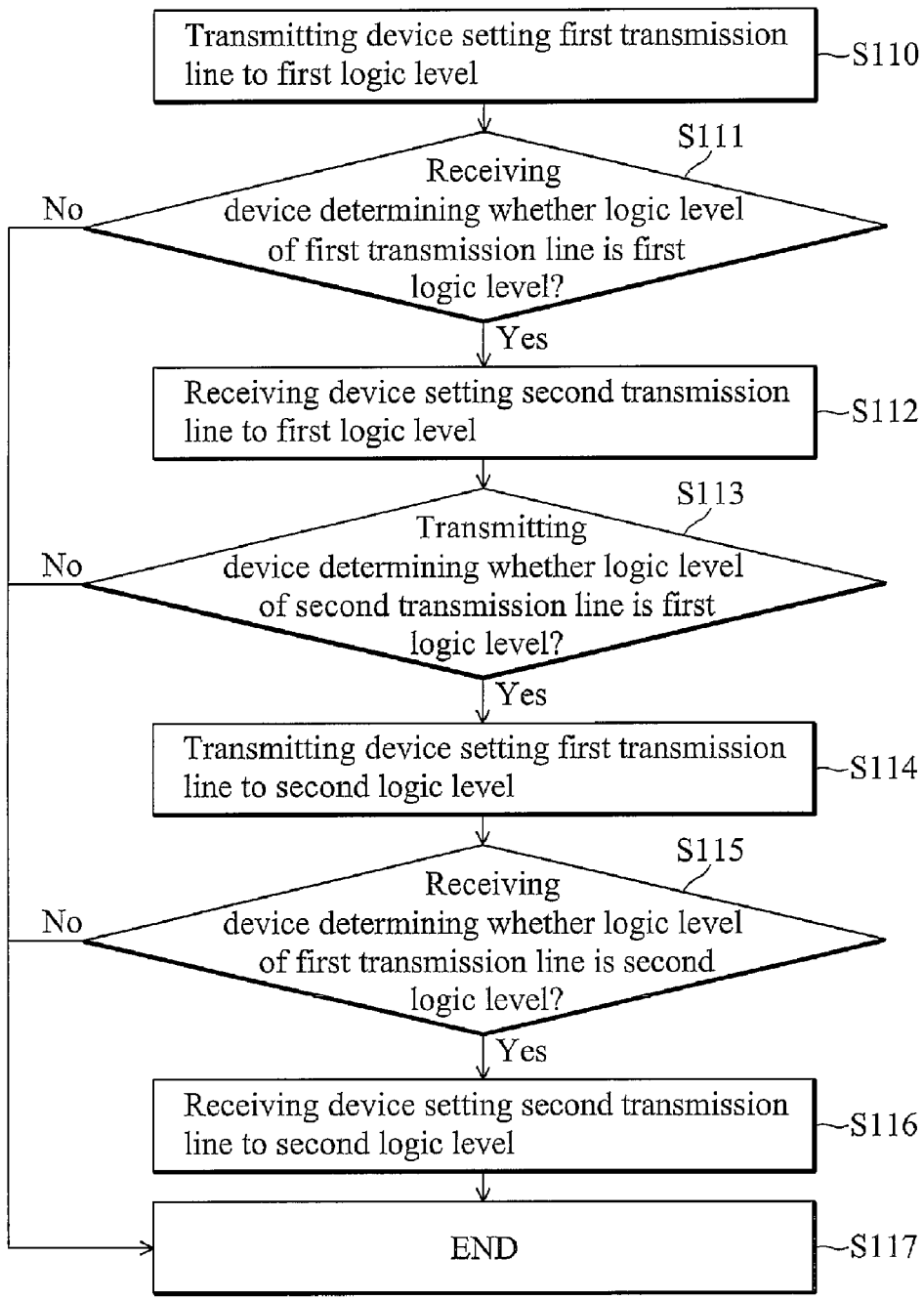
FIG. 2 is a flowchart of an embodiment of a communication protocol method for signal synchronization.

Referring to FIG. 1 and FIG. 2, FIG. 2 is a flowchart of an embodiment of a communication protocol method for signal synchronization. As shown in FIG. 1 and FIG. 2, when the communication protocol method performs signal synchronization between the transmitting device 10 and the receiving device 20, the following steps are performed.

In step S110, the transmitting device 10 sets the first transmission line DATA to a first logic level.

In step S111, the receiving device 20 detects the logic level of the first transmission line DATA, and determines whether the logic level of the first transmission line DATA is the first logic level.

If so (Yes in step S111), in step S112, the receiving device 20 sets the second transmission line ACK to the first logic level. If not (No in step S111), the procedure goes to step S117.

In step S113, the transmitting device 10 detects the logic level of the second transmission line ACK, and determines whether the logic level of the second transmission line ACK is the first logic level.

If so (Yes in step S113), in step S114, the transmitting device 10 sets the first transmission line DATA to a second logic level. If not (No in step S113), the procedure goes to step S117.

In step S115, the receiving device 20 detects the logic level of the first transmission line DATA, and determines whether the logic level of the first transmission line DATA is the second logic level.

If so (Yes in step S115), in step S116, the receiving device 20 sets the second transmission line ACK to the second logic level. If not (No in step S115), the procedure goes to step S117.

In step S117, the procedure is completed.

It is noted that the communication protocol method performs signal synchronization between the transmitting device 10 and the receiving device 20 using the above steps. In this embodiment, the first logic level is a high level "HIGH", and the second logic level is a low level "LOW".

Figure 3:
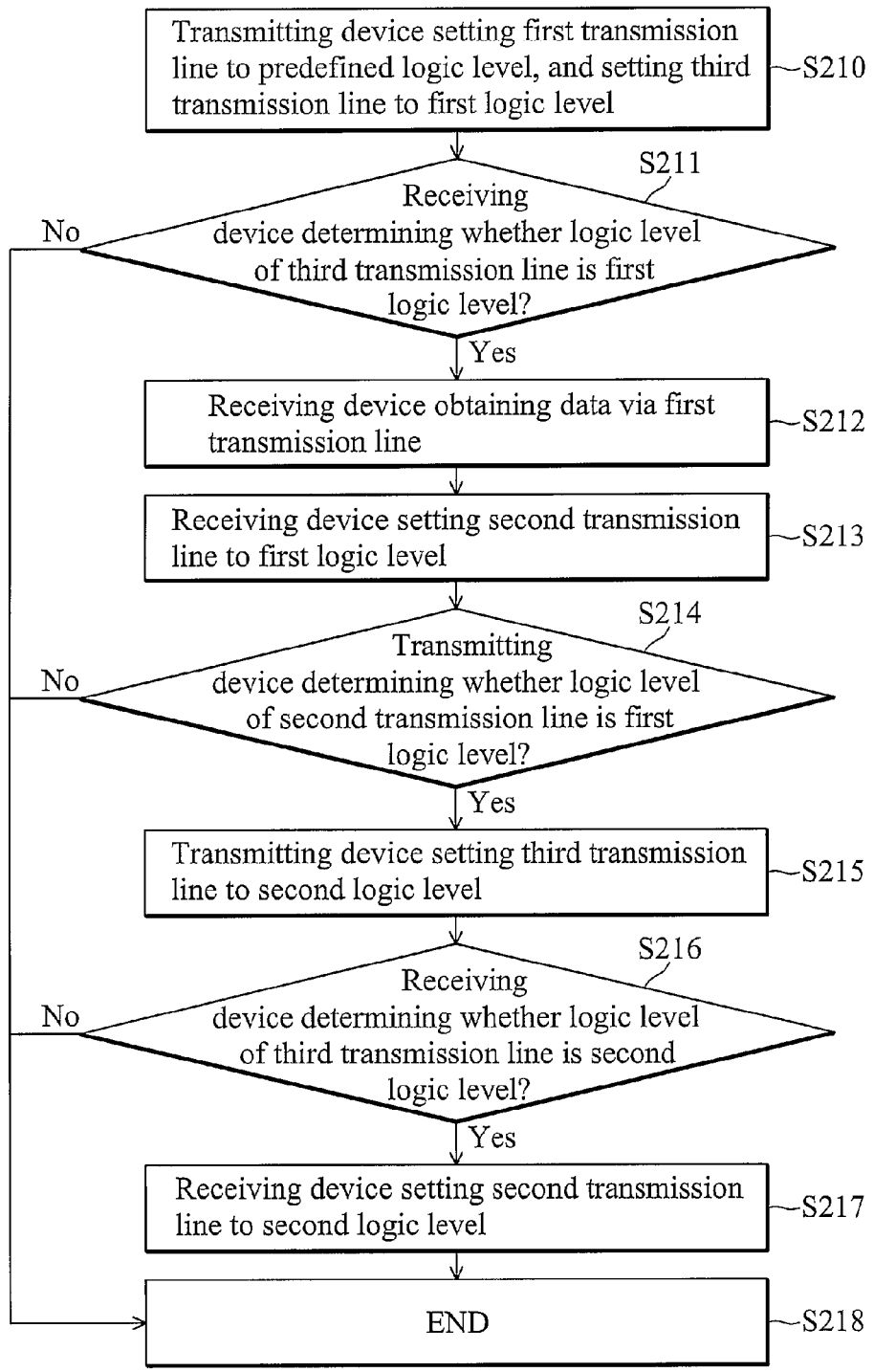
FIG. 3 is a flowchart of an embodiment of a communication protocol method for data transmission.

Referring to FIG. 1 and FIG. 3, FIG. 3 is a flowchart of an embodiment of a communication protocol method for data transmission. As shown in FIG. 1 and FIG. 3, when the communication protocol method performs data transmission between the transmitting device 10 and the receiving device 20, the following steps are performed.

In step S210, the transmitting device 10 sets the first transmission line DATA to a predefined logic level, and sets the third transmission line STB to a first logic level.

In step S211, the receiving device 20 detects the logic level of the third transmission line STB, and determines whether the logic level of the third transmission line STB is the first logic level.

If so (Yes in step S211), in step S212, the receiving device 20 obtains data via the first transmission line DATA. If not (No in step S211), the procedure goes to step S218.

In step S213, the receiving device 20 sets the second transmission line ACK to the first logic level.

In step S214, the transmitting device 10 detects the logic level of the second transmission line ACK, and determines whether the logic level of the second transmission line ACK is the first logic level.

If so (Yes in step S214), in step S215, the transmitting device 10 sets the third transmission line STB to a second logic level. If not (No in step S214), the procedure goes to step S218.

In step S216, the receiving device 20 detects the logic level of the third transmission line STB, and determines whether the logic level of the third transmission line STB is the second logic level.

If so (Yes in step S216), in step S217, the receiving device 20 sets the second transmission line ACK to the second logic level. If not (No in step S216), the procedure goes to step S218.

In step S218, the procedure is completed.

It is noted that the communication protocol method performs data transmission between the transmitting device 10 and the receiving device 20 using the above steps. In step S212, the receiving device 20 can obtain a bit value contained in the data via the first transmission line DATA. Further, the predefined logic level is one of the first logic level and the second logic level. When the bit value is "0", the predefined logic level is the first logic level. When the bit value is "1", the predefined logic level is the second logic level. In this embodiment, the first logic level is a high level "HIGH", and the second logic level is a low level "LOW".

Figure 4:
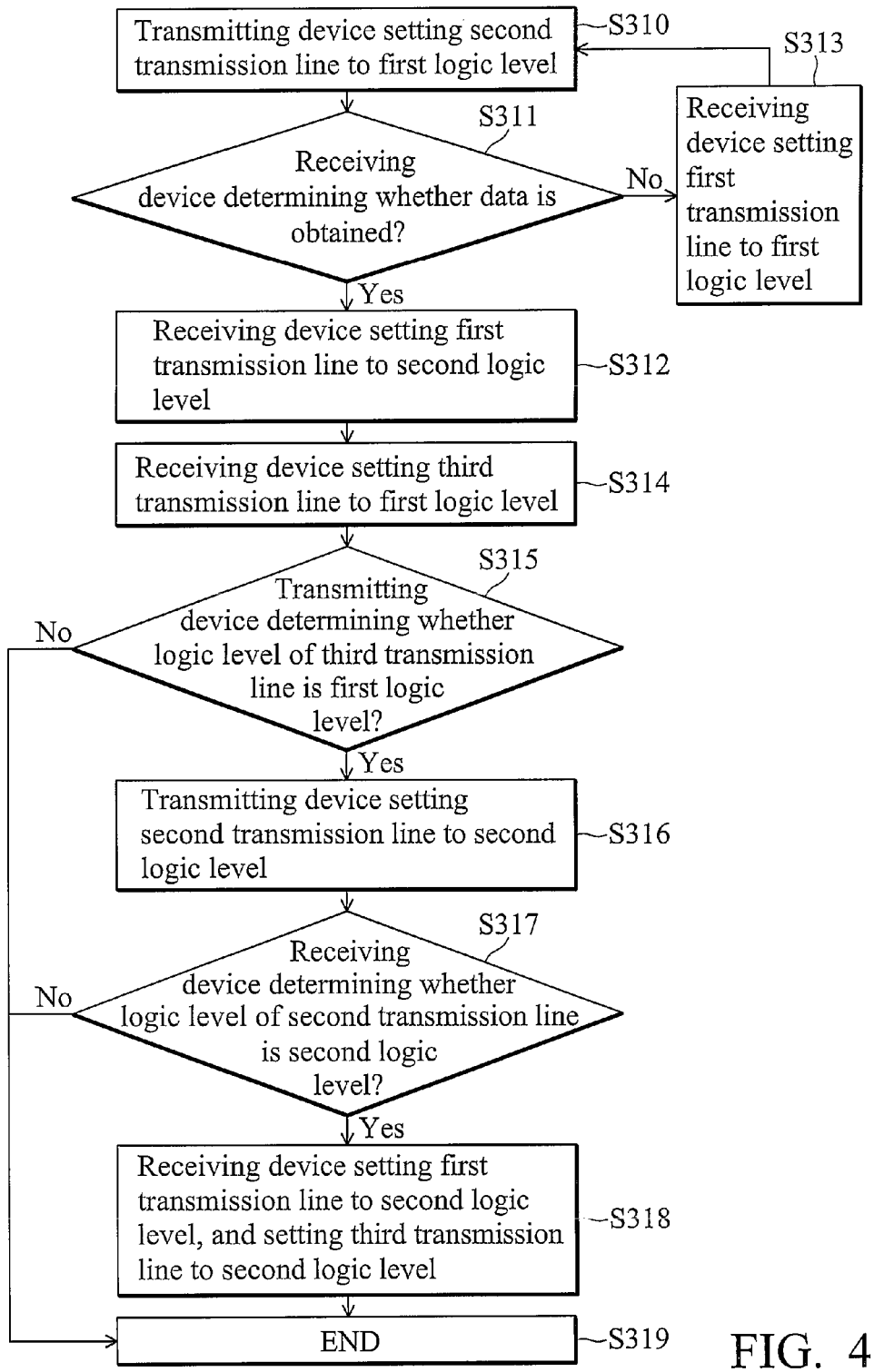
FIG. 4 is a flowchart of an embodiment of a communication protocol method for data acknowledgement.

Referring to FIG. 1 and FIG. 4, FIG. 4 is a flowchart of an embodiment of a communication protocol method for data acknowledgement. As shown in FIG. 1 and FIG. 4, when the communication protocol method performs data acknowledgement between the transmitting device 10 and the receiving device 20, the following steps are performed.

In step S310, the transmitting device 10 sets the second transmission line ACK to a first logic level.

In step S311, the receiving device 20 determines whether data is obtained. In this step, the receiving device 20 determines whether the bit value contained in the data is obtained.

If so (Yes in step S311), in step S312, the receiving device 20 sets the first transmission line DATA to a second logic level.

If not (No in step S311), in step S313, the receiving device 20 sets the first transmission line DATA to the first logic level, and the procedure goes to step S310.

In step S314, the receiving device 20 sets the third transmission line STB to the first logic level.

In step S315, the transmitting device 10 detects the logic level of the third transmission line STB, and determines whether the logic level of the third transmission line STB is the first logic level.

If so (Yes in step S315), in step S316, the transmitting device 10 sets the second transmission line ACK to the second logic level. If not (No in step S315), the procedure goes to step S319.

In step S317, the receiving device 20 detects the logic level of the second transmission line ACK, and determines whether the logic level of the second transmission line ACK is the second logic level.

If so (Yes in step S317), in step S318, the receiving device 20 sets the first transmission line DATA to the second logic level, and sets the third transmission line STB to the second logic level. If not (No in step S317), the procedure goes to step S319.

In step S319, the procedure is completed.

It is noted that the communication protocol method performs data acknowledgement between the transmitting device 10 and the receiving device 20 using the above steps. In this embodiment, the first logic level is a high level "HIGH", and the second logic level is a low level "LOW".

In the communication protocol methods of the application, signal synchronization, data transmission, and data acknowledgement between a transmitting device and a receiving device can be accomplished using simple settings, detections and determinations of logic levels in three transmission lines, thus improving the efficiency and completeness of data transmission.

Communication protocol methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication protocol method for performing signal synchronization, data transmission, and data acknowledgement between a transmitting device and a receiving device, wherein the method is characterized by:
    using a plurality of transmission lines to perform signal synchronization, data transmission, and data acknowledgement;
    wherein the transmission lines comprise a first transmission line (DATA), a second transmission line (ACK), and a third transmission line (STB), and the first transmission line is used for transmitting data, the second transmission line is used for acknowledging data transmission, and the third transmission line is used for performing signal synchronization; and
    wherein the signal synchronization between the transmitting device and the receiving device comprises the steps of:
    (A1) transmitting device setting the first transmission line to a first logic level;
    (B1) the receiving device detecting the logic level of the first transmission line, and determining whether the logic level of the first transmission line is the first logic level, and if so, setting the second transmission line to the first logic level;
    (C1) the transmitting device detecting the logic level of the second transmission line, and determining whether the logic level of the second transmission line is the first logic level, and if so, setting the first transmission line to a second logic level; and (D1) the receiving device detecting the logic level of the first transmission line, and determining whether the logic level of the first transmission line is the second logic level, and if so, setting the second transmission line to the second logic level.

2. The method of claim 1, wherein the first logic level is a high level "HIGH", and the second logic level is a low level "LOW".

3. The method of claim 1, further the data transmission between the transmitting device and the receiving device comprises the steps of:
- (A2) the transmitting device setting the first transmission line to a predefined logic level, and setting the third transmission line to a first logic level;
- (B2) the receiving device detecting the logic level of the third transmission line, and determining whether the logic level of the third transmission line is the first logic level, and if so, obtaining data via the first transmission line;
- (C2) the receiving device setting the second transmission line to the first logic level;
- (D2) the transmitting device detecting the logic level of the second transmission line, and determining whether the logic level of the second transmission line is the first logic level, and if so, setting the third transmission line to a second logic level; and
- (E2) the receiving device detecting the logic level of the third transmission line, and determining whether the logic level of the third transmission line is the second logic level, and if so, setting the second transmission line to the second logic level.

4. The method of claim 3, wherein a bit value contained in the data is obtained via the first transmission line in step (B2).

5. The method of claim 4, wherein the predefined logic level is set according to the bit value.

6. The method of claim 5, wherein the predefined logic level is one of the first logic level and the second logic level.

7. The method of claim 6, wherein the predefined logic level is the first logic level when the bit value is "0", and the predefined logic level is the second logic level when the bit value is "1".

8. The method of claim 7, wherein the first logic level is a high level "HIGH", and the second logic level is a low level "LOW".

9. The method of claim 1, further the data acknowledgement between the transmitting device and the receiving device comprises the steps of:
- (A3) the transmitting device setting the second transmission line to a first logic level;
- (B3) the receiving device determining whether data is obtained, and if so, setting the first transmission line to a second logic level, if not, setting the first transmission line to the first logic level;
- (C3) the receiving device setting the third transmission line to the first logic level;
- (D3) the transmitting device detecting the logic level of the third transmission line, and determining whether the logic level of the third transmission line is the first logic level, and if so, setting the second transmission line to the second logic level; and
- (E3) the receiving device detecting the logic level of the second transmission line, and determining whether the logic level of the second transmission line is the second logic level, and if so, setting the first transmission line to the second logic level, and setting the third transmission line to the second logic level.

10. The method of claim 9, wherein step (B3) determines whether a bit value contained in the data is obtained.

11. The method of claim 9, wherein the first logic level is a high level "HIGH", and the second logic level is a low level "LOW".

* * * * *